(12) United States Patent
Tan

(10) Patent No.: US 12,392,657 B2
(45) Date of Patent: *Aug. 19, 2025

(54) OPTICAL SENSOR ACQUIRING IMAGE FRAMES CORRESPONDING TO AMBIENT LIGHT FLICKERS

(71) Applicant: PixArt Imaging Inc., Hsin-Chu County (TW)

(72) Inventor: Zi-Hao Tan, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 14 days.

This patent is subject to a terminal disclaimer.

(21) Appl. No.: 18/585,101

(22) Filed: Feb. 23, 2024

(65) Prior Publication Data

US 2024/0201011 A1     Jun. 20, 2024

Related U.S. Application Data

(63) Continuation of application No. 17/722,637, filed on Apr. 18, 2022, now Pat. No. 11,946,800, which is a continuation-in-part of application No. 17/124,332, filed on Dec. 16, 2020, now Pat. No. 11,422,025.

(51) Int. Cl.
*G01J 1/42* (2006.01)
*G01J 1/44* (2006.01)
*G01P 13/00* (2006.01)

(52) U.S. Cl.
CPC .............. *G01J 1/4204* (2013.01); *G01J 1/44* (2013.01); *G01P 13/00* (2013.01); *G01J 2001/446* (2013.01)

(58) Field of Classification Search
CPC ...... G01J 1/44; G01J 1/4204; G01J 2001/446; G01P 13/00

See application file for complete search history.

(56) References Cited

U.S. PATENT DOCUMENTS

| | | | |
|---|---|---|---|
| 11,422,025 B2 * | 8/2022 | Tan | G01J 1/44 |
| 11,946,800 B2 * | 4/2024 | Tan | G01J 1/44 |
| 2011/0186714 A1 * | 8/2011 | Hung | G01J 1/44 |
| | | | 250/214 AL |
| 2012/0154629 A1 * | 6/2012 | Horiuchi | H04N 7/0127 |
| | | | 348/226.1 |

FOREIGN PATENT DOCUMENTS

| CN | 101895691 A | | 11/2010 | |
| CN | 109151256 A | * | 1/2019 | ............. H04N 5/217 |

* cited by examiner

*Primary Examiner* — Jennifer D Bennett
(74) *Attorney, Agent, or Firm* — WPAT, PC

(57) ABSTRACT

There is provided an optical sensor including a photodiode, a wave converter, a pixel array and a processor. The photodiode detects ambient light flicker to generate sine waves. The wave converter converts the sine waves to square waves. The processor uses a sampling frequency to count the square waves, and identifies whether the ambient light flicker is well detected according to a counting value of each square wave and a counting value variation of multiple square waves within a count period to accordingly determine whether to recognize a frequency of ambient light flicker and adjust an acquiring phase of the image frame.

20 Claims, 6 Drawing Sheets

OPTICAL SENSOR ACQUIRING IMAGE FRAMES CORRESPONDING TO AMBIENT LIGHT FLICKERS

CROSS REFERENCE TO RELATED APPLICATION

The present application is a continuation application of U.S. patent application Ser. No. 17/722,637 filed on, Apr. 18, 2022, which is a continuation-in-part application of U.S. patent application Ser. No. 17/124,332 filed on, Dec. 16, 2020, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical sensor and, more particularly, to an optical sensor that recognizes a flicker frequency of ambient light and synchronizes a frame rate of the optical sensor to the flicker frequency of ambient light to eliminate the influence of ambient light.

2. Description of the Related Art

The motion detector adopting an optical sensor identifies the object motion by calculating light intensity variation in image frames captured by the optical sensor. As indoor ambient light is sometimes provided by the fluorescent lamps that have flickers due to AC nature of the power system, when this kind of optical sensor is operated indoor, the average brightness of the image frames captured by the optical sensor can fluctuate between bright and dark if a frame rate of the optical sensor is not synchronized to a flicker frequency of ambient light such that incorrect motion may be identified. The flicker frequency of ambient light is determined according to an AC frequency of the power system.

For example referring to FIG. 1, it is a schematic diagram of acquiring image frames corresponding to ambient light fluctuation by a conventional optical sensor. When the optical sensor captures a first frame 1 while the ambient light fluctuates to its brightest intensity, the first frame 1 has the maximum average brightness; whereas when the optical sensor captures a second frame 2 while the ambient light fluctuates to its darkest intensity, the second frame 2 has the minimum average brightness; and the average brightness of the third frame 3 is between those of the first frame 1 and the second frame 2. The intensity fluctuation of frames 1 to 3 can lead to identifying an incorrect object motion.

Accordingly, the present disclosure further provides an optical sensor that recognizes a flicker frequency of ambient light and synchronizes a frame rate of the optical sensor to the flicker frequency of ambient light when the ambient light flicker is well detected.

SUMMARY

The present disclosure provides an optical sensor that includes an individually operated photodiode for detecting flicker pulses of ambient light. The digital backend of the optical sensor identifies whether the fluctuation of ambient light is well detected or not according to the flicker pulses and the synchronization procedure is performed only when a well detection of ambient light is confirmed.

The present disclosure further provides an optical sensor that can eliminate influence of a flicker frequency of ambient light at different AC mains by maintaining an identical frame rate corresponding to the different AC mains.

The present disclosure provides an optical al sensor including a photodiode, a wave converter, a pixel array and a digital backend. The photodiode is configured to detect ambient light flicker to generate a light signal. The wave converter is configured to receive the light signal and to generate a square wave signal. The pixel array is configured to acquire image frames according to frame ticks. The digital backend is configured to count the square wave signal using a sampling frequency, generate a trigger tick for adjusting the frame ticks, compare a counting value of a last square wave signal in a count period with at least one count threshold to identify whether a frequency of the ambient light flicker is a first frequency or a second frequency when the trigger tick is generated, and generate the frame ticks corresponding to the first frequency and the second frequency.

The present disclosure further provides an optical sensor including a photodiode, a wave converter, a pixel array and a digital backend. The photodiode is configured to detect ambient light flicker to generate a light signal. The wave converter is configured to receive the light signal and to generate a square wave signal. The pixel array is configured to acquire image frames according to frame ticks. The digital backend is configured to count the square wave signal using a sampling frequency, generate a trigger tick for adjusting the frame ticks, and compare a counting value of a last square wave signal in a count period with at least one count threshold to identify whether a frequency of the ambient light flicker is a first frequency or a second frequency when the trigger tick is generated. The pixel array is configured to acquire the image frames corresponding to the first frequency and the second frequency.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The optical sensor of the present disclosure is adapted to be operated under fluctuating ambient light having a flicker frequency. When the ambient light flicker is well detected, the synchronization between image frames and the flicker frequency is performed to eliminate the incorrect motion identification. Meanwhile, to reduce the useless adjustment, when the ambient light flicker is not well detected, the synchronization mechanism is not executed. In the present disclosure, whether the ambient light flicker is well detected or not is identified according to stability of the period variation of ambient light detected within a predetermined time interval.

Figure 1:
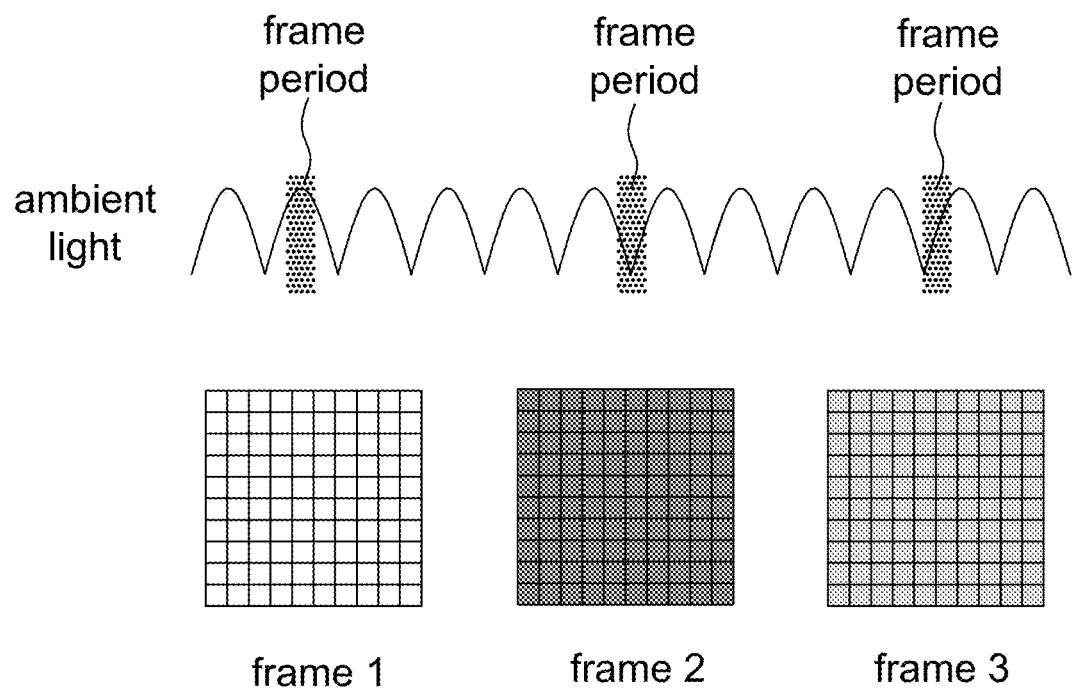
FIG. 1 is a schematic diagram of acquiring image frames corresponding to ambient light fluctuation by a conventional optical sensor.
Figure 2:
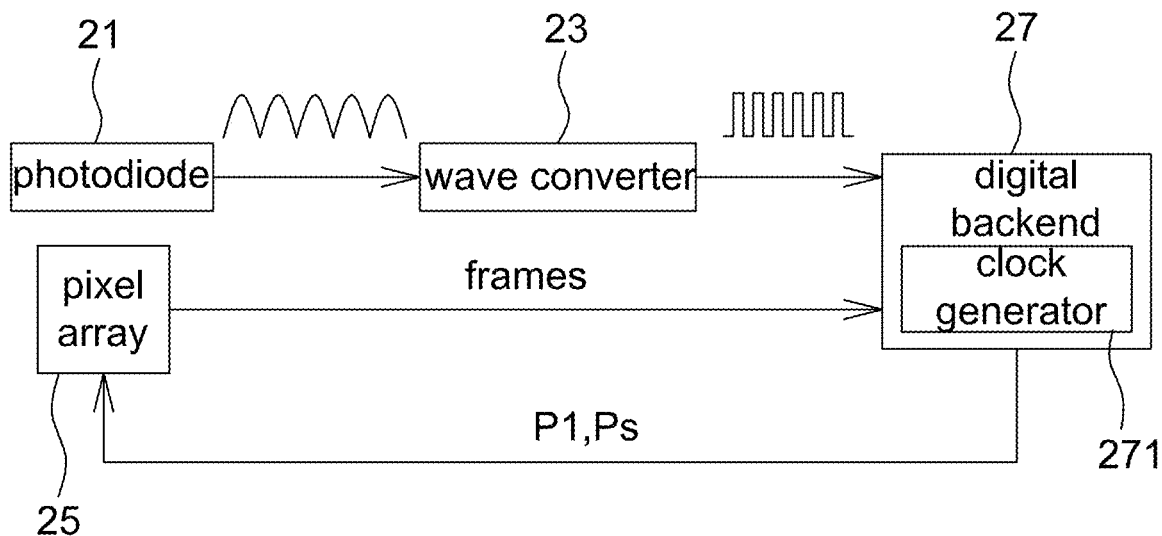
FIG. 2 is a schematic block diagram of an optical sensor according to one embodiment of the present disclosure.

Please referring to FIG. 2, it is a schematic block diagram of an optical sensor 200 according to one embodiment of the present disclosure. The optical sensor 200 is embedded in any camera or video camera suitable for the motion detection. The optical sensor 200 includes a photodiode 21, a wave converter 23, a pixel array 25 and a digital backend 27, wherein the digital backend 27 includes a clock generator 271 for generating clock signals having a clock frequency which is selected according to different applications, e.g., 64 KHZ, but the present disclosure is not limited thereto.

The photodiode 21 is used to detect ambient light flicker to generate and output sine wave signals. It is appreciated that when ambient light has no flicker, the photodiode 21 does not output the sine wave signal. In one aspect, the photodiode 21 is an independent component separated from the pixel array 25. In another aspect, the photodiode 21 is at least one pixel of the pixel array 25, e.g., at least one edge pixel of the pixel array 25, but not limited to the edge pixel. When the photodiode 12 is formed by multiple pixels, the output thereof is a summation or an average of raw data of the multiple pixels, and the summation or the average is calculated by the circuit of the pixel array 25.

Figure 3A:
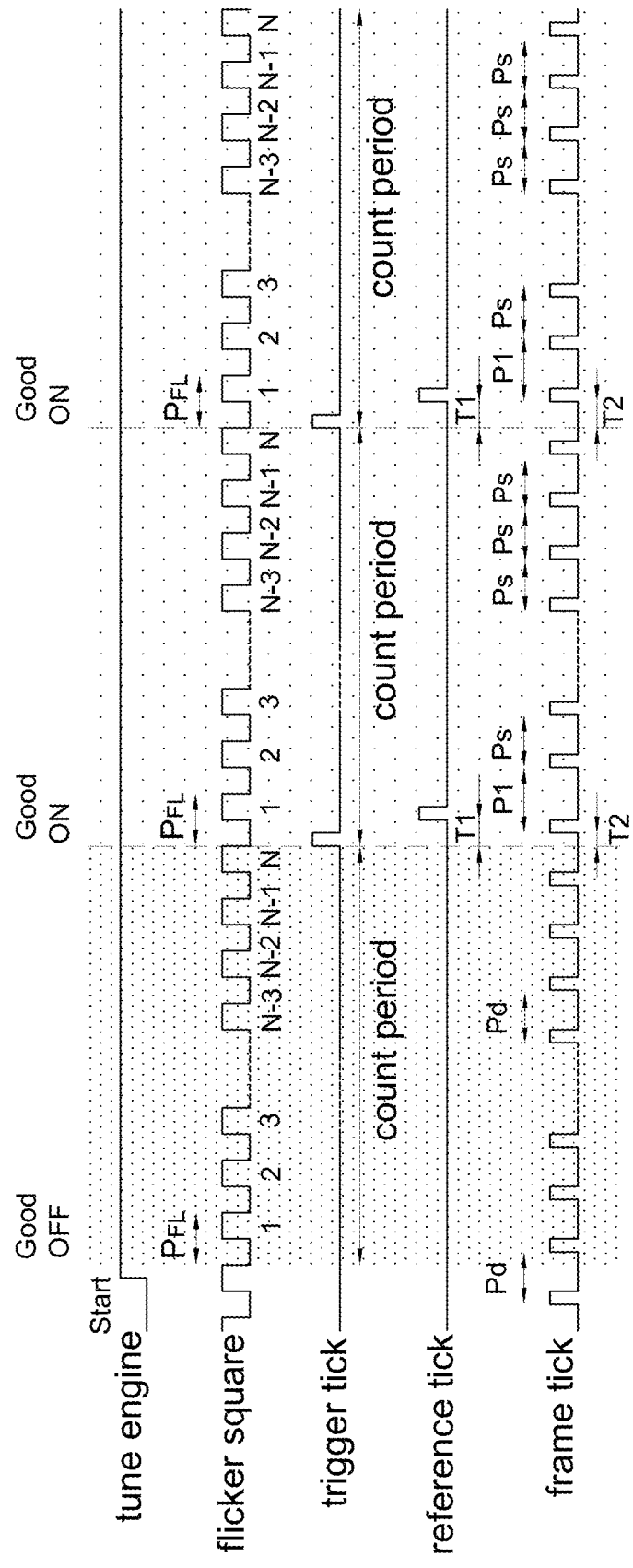
FIGS. 3A and 3B are operational schematic diagrams of an optical sensor according to some embodiments of the present disclosure.
Figure 3B:
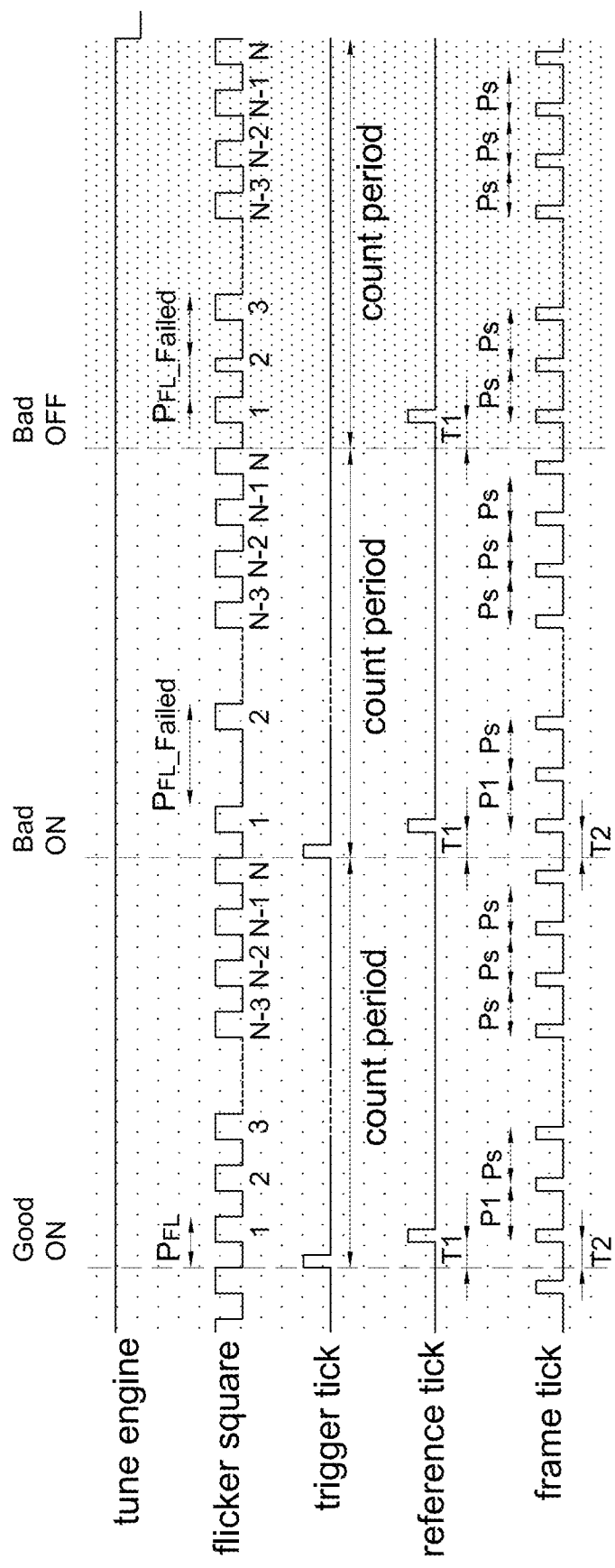

The wave converter 23 is electrically coupled to the photodiode 21, and used to convert the sine wave signals to square wave signals that have a square wave period $P_{FL}$, as shown in FIGS. 3A and 3B. When the photodiode 21 well detects light fluctuation of the fluorescent lamp, the square wave period $P_{FL}$ is equal to, for example, 1/100 second or 1/120 second. The wave converter 23 of the present disclosure adopts a conventional sine-to-square wave converter. For example, one commonly used technique for converting from a sine wave to a square wave is to apply the AC sine waves to a CMOS inverter or to one input of a comparator, but not limited thereto. In the present disclosure, the square wave signal is used to estimate whether the ambient light flicker is well detected or not within a count period, e.g., FIG. 3A showing good count periods, and FIG. 3B showing good and bad count periods.

The pixel array 25 is, for example, a pixel array of a CMOS image sensor, and includes multiple pixel circuits. The pixel array 25 is used to acquire image frames according to frame ticks, which are used to determine a frame period of acquiring image frames. For example, the pixel array 25 is arranged to acquire one image frame corresponding to each frame tick, or to acquire one image frame every multiple frame ticks (e.g., 10 frame ticks, but not limited thereto) according to different applications.

The digital backend 27 is, for example, a digital signal processor (DSP), a microcontroller unit (MCU) or an application specific integrated circuit (ASIC). The digital backend 27 counts square wave signals outputted from the wave converter 23 using a sampling frequency (e.g., generated by the clock generator 271), and generates a trigger tick for adjusting the frame ticks according to a counting value of every square wave signal within one count period and a consistency of multiple counting values of all square wave signals within the count period. In the present disclosure, one count period includes multiple square wave signals so as to evaluate whether the ambient light flicker is well detected or not with a predetermined time interval (e.g., the count period). For example, when one count period is arranged to include 100 (corresponding to 50 HZ AC power system) or 120 (corresponding to 60 HZ AC power system) square wave periods $P_{FL}$ of the square wave signal, the predetermined time interval is 1 second, but not limited thereto. The length of the square wave period is selected in manually, e.g., by pressing a button or selecting from a human-machine interface, or measured according to a counting value of every square wave signal, e.g., the counting value between adjacent rising edges or falling edges of square pulses.

In the present disclosure, for illustration purposes, it is assumed the AC frequency of the power system is 50 HZ, the sampling frequency generated by the clock generator 271 is 64 KHZ, and the count period is arranged as 100 square wave periods, e.g., N shown in FIGS. 3A and 3B being equal to 100, but the present disclosure is not limited thereto. In other aspects, N is set as other values corresponding to a clock frequency of the clock generator 271 and an AC frequency of the power system.

Please referring to FIGS. 3A and 3B, they are operational schematic diagrams of an optical sensor 200 according to some embodiments of the present disclosure, wherein FIG. 3A shows the operation after the synchronization is started, e.g., a tune engine (e.g., implemented by hardware and/or firmware) of the digital backend 27 receiving a start operation signal (e.g., by pressing a button or executing an APP), which is shown by the signal level changing from a low level to a high level. After the synchronization is started, the photodiode 21 starts to output sine wave signals to the wave converter 23 to generate and output square wave signals to the digital backend 27. The digital backend 27 counts every square wave signal within a count period to obtain a counting value corresponding to the every square wave signal. However, whether the photodiode 21 outputs the sine wave signal before the synchronization is activated is not particularly limited herein.

FIG. 3B shows that poor square wave signals are detected, e.g., $P_{FL}$\_Failed showing unstable square wave periods.

Firstly, the digital backend 27 identifies whether the ambient light flicker has good consistency or not within each count period to confirm whether to perform the frame tick adjustment.

When the digital backend 27 identifies that square weave signals in one count period (e.g., the first count period in FIG. 3A) have high consistency, a trigger tick is generated in a next count period (e.g., the second count period in FIG. 3A) to indicate that the phase of frame ticks is adjusted (i.e. fine-tuning the frame period under the same AC power frequency) in the next count period to cause the acquiring of image frames of the pixel array 25 to synchronize to the ambient light flicker. For example, FIG. 3A shows that the ambient light flicker is well detected in every count period, and a trigger tick is respectively generated in the second and third count periods.

In FIG. 3A, as there is no counting result previous to the first count period, the digital backend 27 does not generate any trigger tick and does not execute the synchronization procedure in the first count period, e.g., shown as OFF. More specifically, in the present disclosure the synchronization mechanism is not directed started when a signal level of the tune engine is changed.

When the digital backend 27 identifies that square wave signals within one count period have low consistency, a trigger tick is not generated in a next count period behind the one count period, and the image frames and the ambient light flicker are not synchronized in said next count period. For example, FIG. 3B shows that the ambient light flicker is not well detected in the second count period and thus a trigger tick is not generated in the third count period. In the present disclosure, a rising edge of the trigger tick is arranged to be in-phase with a falling edge of a last square wave signal of a previous count period. In addition to being used to control whether to perform the synchronization between the image frames and the ambient light flicker, the trigger tick is further used as a comparison basis for the reference tick and the frame ticks.

In the present disclosure, the digital backend 27 identifies the consistency of square wave signals based on two conditions. The first condition is that the digital backend 27 identifies whether a counting value of every square wave signal within one count period is within two predetermined thresholds or not. As mentioned above, when the digital backend 27 counts a 100 HZ square wave signal using 64 KHZ sampling signals, one square wave signal includes 640 counts in an ideal condition. In the present disclosure, the first threshold is arranged as, e.g., 64 KHZ/90 HZ=711; and the second threshold is arranged as, e.g., 64 KHZ/110 HZ=581. According to different sensitivity requirements, the first threshold and the second threshold are set higher or lower, and the above values are only intended to illustrate but not to limit the present disclosure.

The second condition is that the digital backend 27 identifies whether a difference value between a maximum counting value and a minimum counting value among all counting values (e.g., FIGS. 3A and 3B showing N=100) within one count period is within a predetermined range. For example, when the predetermined range is set as 1% of 640 counts, the predetermined range is 6 counts. Similarly, according to different sensitivity requirements, the predetermined range is set wider or smaller.

In the present disclosure, when the digital backend 27 identifies that the counting value of every square wave signal within one count period is within two predetermined thresholds (e.g., 581 and 711 mentioned above), and a difference value between a maximum counting value and a minimum counting value among all counting values in said one count period is within a predetermined range (e.g., 6 counts), it means that high consistency is confirmed and thus a trigger tick is generated in a next count period behind said one count period to synchronize the image frames and the ambient light flicker. In another aspect, when identifying only a predetermined number (e.g., 2, but not limited to) of square wave signals within said one count period having the counting value not within the two predetermined thresholds, the digital backend 27 still identifies that said one count period has high consistency.

In addition, when the digital backend 27 identifies that not every square wave signal (or more than the predetermined number) within one count period has the counting value within the two predetermined thresholds, or the difference value between the maximum counting value and the minimum counting value among all counting values in said one count period exceeds the predetermined range, it means that low consistency is confirmed and thus no trigger tick is generated in a next count period behind said one count period as well as the synchronization between the image frames and the ambient light flicker is not performed.

For example, the synchronization procedure is performed in the second and third count periods of FIG. 3A as well as the first and second count periods of FIG. 3B (e.g., shown as ON), but is not performed in the third count period of FIG. 3B (e.g., shown as OFF).

After the consistency of square wave signals is identified, the digital backend 27 performs the synchronization procedure.

The digital backend 27 further selects to generate a reference tick in every count period. FIGS. 3A and 3B show that a rising edge of the reference tick is in-phase with a rising edge of a first square wave signal in the same count period. When identifying that square wave signals of one count period have high consistency, the digital backend 27 calculates a time offset |T1−T2| between the reference tick and a first frame tick in the same count period (i.e. a next count period of said one count period) to adjust a first period P1 between a second frame tick of the next count period and the first frame tick according to the time offset |T1−T2|. More specifically, the time offset |T1−T2| indicates a time difference between the frame ticks and the square wave signals generated from ambient light flicker, and the digital backend 27 adjusts the acquiring phase of the pixel array 25 according to the time offset |T1−T2|, e.g., FIG. 3A showing that the acquiring phase of the second frame tick in the second count period is postponed to be synchronized to a second square wave signal, i.e., N=2.

In one aspect, the digital backend 27 calculates a first time difference T1 between the reference tick and the trigger tick in a next count period, calculates a second time difference T2 between a first frame tick and the trigger tick in the next count period, and calculates a difference value between the first time difference T1 and the second time different T2 as the time offset |T1−T2|. As shown in the second count period of FIG. 3A, P1=Ps+|T1−T2|, wherein Ps is a subsequent period of frame ticks behind the second frame tick of the next count period. The subsequent period Ps is shown to be equal to one square wave period of the square wave signal, e.g., one frame tick being generated every 640 oscillations of the sampling frequency.

More specifically, in the present disclosure the digital backend 27 adjusts a period between the first frame tick and the second frame tick, i.e. first period P1, in a next count period only when square wave signals in one count period (previous to said next count period) have high consistency, and the subsequent period Ps behind the second frame tick is arranged to be identical to the square wave period. In addition, when the square wave signals in one count period do not have high consistency, the first period P1 between the first frame tick and the second frame tick in the next frame period thereof is arranged to be identical to the subsequent period Ps, e.g., referring to the third count period in FIG. 3B.

As mentioned above, the pixel array 25 acquires one image frame corresponding to every frame tick or every multiple frame ticks. Accordingly, a frame period of the image frames acquired by the pixel array 25 is equal to a square wave period or multiple times of the square wave period of the square wave signals, wherein said multiple times is, for example, a positive integer larger than 1, but not limited to integers. As mentioned, as the digital backend 27 is to adjust a second frame tick in the next count period behind a counted period, the digital backend 27 adjusts an acquiring phase of a secondly acquired image frame (corresponding to the second frame tick) of the next count period when the frame period is arranged to be equal to the square wave period as well as the trigger tick is generated. However, when the frame period is arranged to be multiple times (e.g., 10 times) of the square wave period, the digital backend 27 adjusts an acquiring phase of a firstly acquired image frame (e.g., corresponding to the tenth frame tick) of the next count period. That is, when a pulse time of the second frame tick is adjusted, other pulse times therebehind are also adjusted at the same time.

In one aspect, when a rising edge of the reference tick is in-phase with a rising edge of the first square wave signal in the same count period, the digital backend 27 does not generate the reference tick but directly uses the rising edge of the first square wave signal in the same count period as the reference tick. In other aspects, a reference tick is generated and arranged to opposite to other phases of the first square wave signal or opposite to other square wave signals in the same count period as long as the reference tick has a fixed phase relationship with the square phase signal in every count period.

The synchronization procedure of the present disclosure is testified as follows: (1) Operating the optical sensor 200 of the present disclosure under a light source (e.g., fluorescent lamp) having a fixed flicker frequency and examining whether a frame rate of the pixel array 25 is synchronizing to the fixed flicker frequency stably. (2) Blocking and unblocking the fluorescent lamp in turn to cause noises in the detection signal (e.g., the square wave signal mentioned above) and confirming whether the frame rate of the pixel array 25 is steady. As mentioned above, the synchronization procedure of the present disclosure is performed only when the ambient light flicker is well detected within a predetermined time interval, and thus if the frame rate still changes with existence of noises, it means that the synchronization procedure of the present disclosure is not performed normally. (3) Turning off the fluorescent lamp and confirming whether the frame rate of the pixel array 25 is maintained the same as that before the fluorescent lamp is turned off. As mentioned above, the frame rate of the pixel array 25 of the present disclosure maintains at the same frame rate after the fluorescent lamp is turned off, and thus if the frame rate changes after the fluorescent lamp is turned off, it means that the synchronization procedure of the present disclosure is not performed normally.

It is appreciated that if the sampling frequency is not changed but the flicker frequency of ambient light is changed, e.g., changing from 100 HZ to 120 HZ, the counting value of each $P_{FL}$ and a length of Ps are changed correspondingly.

Therefore, the present disclosure further provides an optical sensor capable of recognizing a flicker frequency (e.g., 100 HZ or 120 HZ) of ambient light, and capable of synchronizing image frames to ambient light flicker having different frequencies using the operation in FIGS. 3A and 3B mentioned above.

Figure 4A:
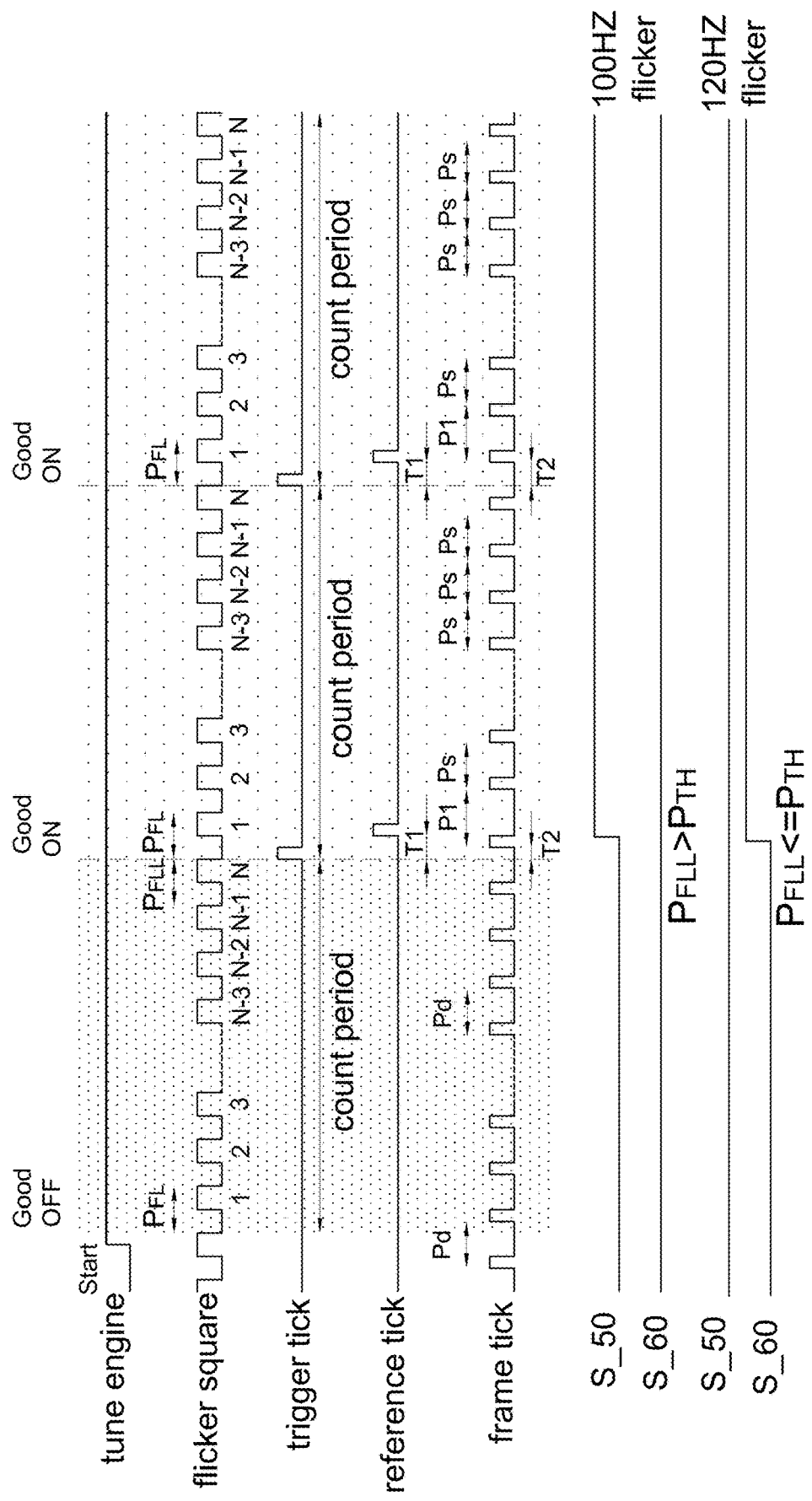
FIGS. 4A and 4B are operational schematic diagrams of an optical sensor according to another embodiment of the present disclosure.
Figure 4B:
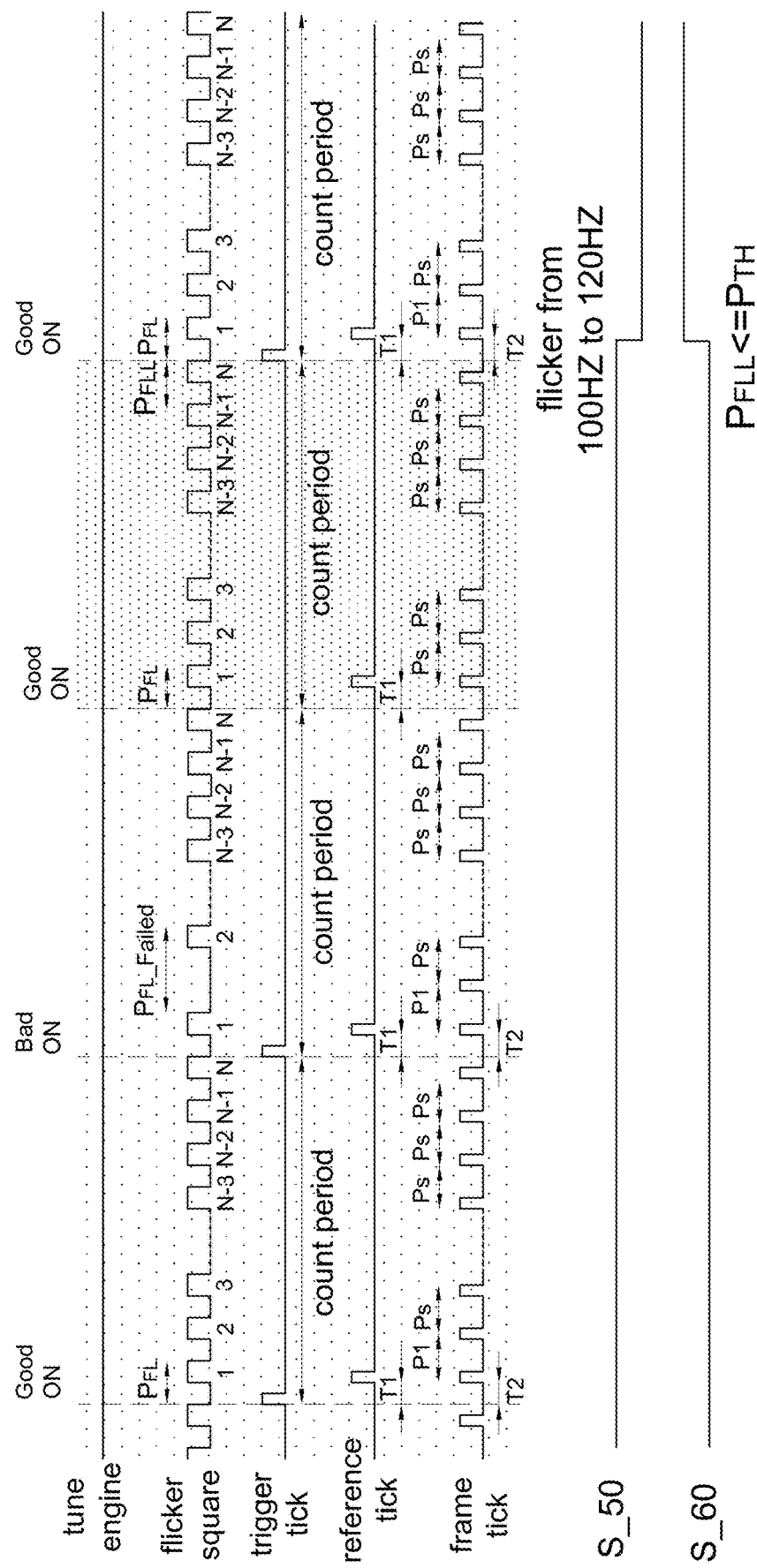
Figure 5:
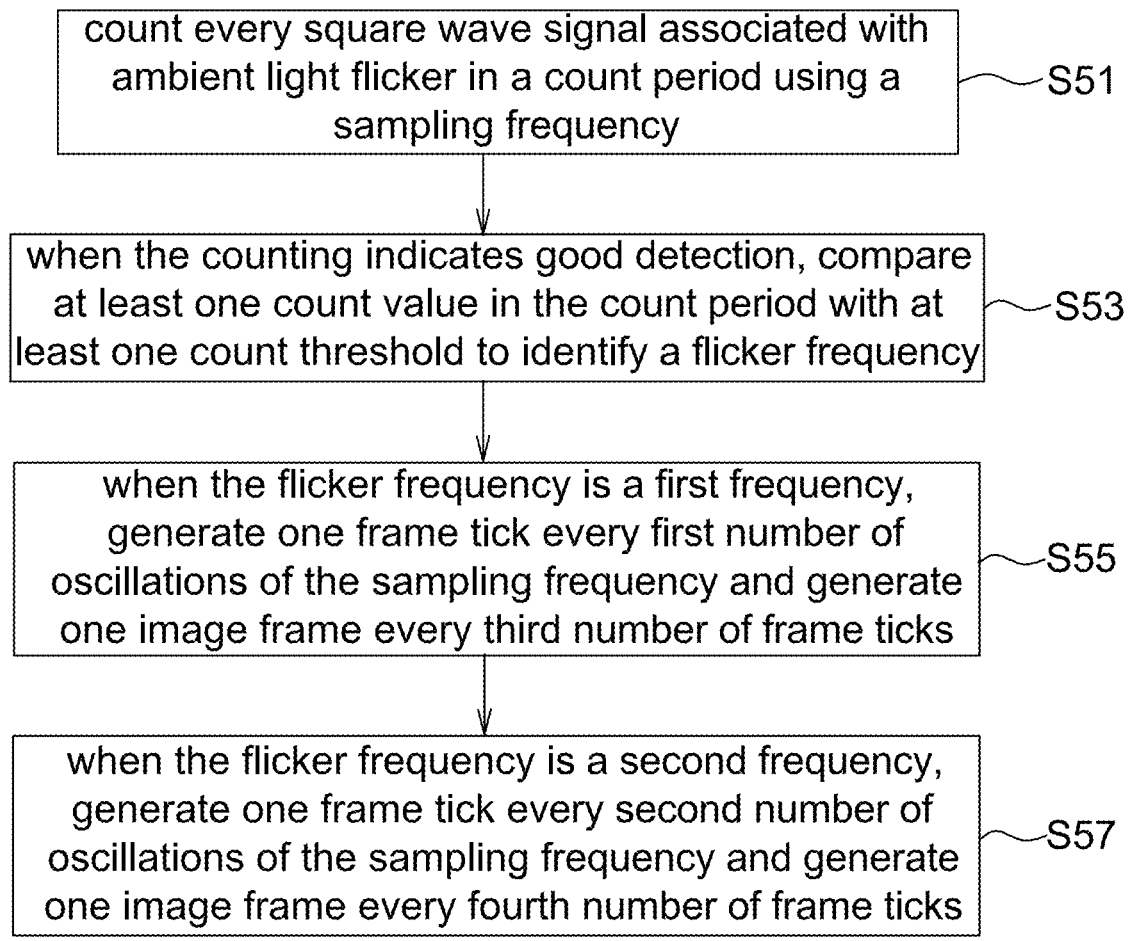
FIG. 5 is a flowchart of an operating method of an optical sensor according to another embodiment of the present disclosure.

In FIGS. 4A and 4B, when a signal S_50 is at a high level and a signal S_60 is at a low level, it means that the digital backend 27 identifies a frequency of ambient light flicker is 100 HZ; whereas, when the signal S_50 is at a low level and the signal S_60 is at a high level, it means that the digital backend 27 identifies the frequency of ambient light flicker is 120 HZ, or vice versa. In other aspects, the digital backend 27 uses at least one bit to indicate whether the frequency of ambient light flicker is 100 HZ or 120 HZ (or 50 HZ or 60 HZ AC mains) without particular limitations.

This embodiment is also described using the optical sensor 200 in FIG. 2.

Similarly, in this embodiment, the photodiode 21 detects ambient light flicker to generate a light signal, e.g., sine wave signal shown in FIG. 2. As mentioned above, the photodiode 21 is separated from the pixel array 25, or included in at least one edge pixel of the pixel array 25. The wave converter 23 receives the light signal to generate a square wave signal, e.g., converting the sine wave signal to the square wave signal. The pixel array 25 acquires image frames according to frame ticks. The digital backend 27 counts the square wave signal using a sampling frequency (or called clock signal) generated by the clock generator 271, generates a trigger tick for adjusting the frame ticks according to a counting value of every square wave signal within a count period as well as consistency of multiple counting values of all square wave signals within the count period.

FIG. 4A shows three count periods, and FIG. 4B shows four count periods.

In this embodiment, a number of square wave signals contained within one count period (i.e. N) is regulated according to the recognized flicker frequency of ambient light. For example, under 100 HZ flicker frequency, each count period is set to contain 100 square wave periods of the square wave signal (i.e. N=100); and under 120 HZ flicker frequency, each count period is set to contain 120 square wave periods of the square wave signal (i.e. N=120), but not limited thereto.

The method that the digital backend 27 identifies whether the ambient light flicker within each count period is well detected or not is identical to that described in the above embodiments, e.g., whether all counting values within one count period are within two predetermined thresholds, and whether a difference value between a maximum counting value and a minimum counting value among the all counting values within the one count period is within a predetermined range as mentioned above, and thus details thereof are not repeated herein.

In this embodiment, when identifying that the ambient light flicker is well detected (as defined above), the digital backend 27 further identifies whether a frequency of ambient light flicker is a first frequency or a second frequency; whereas, when identifying that the ambient light flicker is not well detected (as defined above), the digital backend 27 does not identify whether the frequency of ambient light flicker is the first frequency or the second frequency. This embodiment is described with an example that the first frequency is 100 HZ and the second frequency is 120 HZ.

In one aspect, when the trigger tick (shown as the third signal in FIGS. 4A and 4B) is generated (indicating the ambient light flicker being well detected), the digital backend 27 compares a counting value of a last square wave signal (e.g., shown as $P_{FLL}$) with at least one count threshold $P_{TH}$ to identify whether a frequency of ambient light flicker is a first frequency or a second frequency. On the other hand, when the trigger tick is not generated (indicating the ambient light flicker not being well detected), the digital backend 27 does not compare the counting value of the last square wave signal $P_{FLL}$ with the at least one count threshold $P_{TH}$. That is, the trigger tick is used as a signal indicating that the digital backend 27 determines whether to identify a frequency of ambient light flicker. In other aspects, the trigger tick is replaced by a digital value having more than one bit.

In an alternative embodiment, no specific signal is generated as long as the digital backend 27 knows the flicker detection is good or not.

In this embodiment, the count threshold $P_{TH}$ is determined according to one of two predetermined thresholds of counting values of every square wave signal in one count period operated under the first frequency and one of two predetermined thresholds of counting values of every square wave signal in one count period operated under the second frequency.

For example, in the aspect that the two predetermined thresholds are 5% above and below the AC mains frequency, said two predetermined thresholds are set as 673 counts (corresponding to 95 HZ) and 610 counts (corresponding to 105 HZ) when the flicker frequency is 100 HZ, and said two predetermined thresholds are set as 560 counts (corresponding to 114 HZ) and 508 counts (corresponding to 126 HZ) when the flicker frequency is 120 HZ.

In one aspect, the count threshold $P_{TH}$ is set as (610+560)/2=585 counts. When identifying that a counting value of $P_{FLL}$ is larger than $P_{TH}$, the digital backend 27 identifies that the frequency of ambient light flicker is 100 HZ; whereas, when identifying that the counting value of $P_{FLL}$ is smaller than or equal to $P_{TH}$, the digital backend 27 identifies that the frequency of ambient light flicker is 120 HZ.

In another aspect, the count threshold $P_{TH}$ is set to include two values, e.g., 610 counts and 560 counts. When identifying that a counting value of $P_{FLL}$ is larger than or equal to 610, the digital backend 27 identifies that the frequency of ambient light flicker is 100 HZ; whereas, when identifying that the counting value of $P_{FLL}$ is smaller than or equal to 560, the digital backend 27 identifies that the frequency of ambient light flicker is 120 HZ.

It should be mentioned that set value(s) of the count threshold $P_{TH}$ is not limited to those mentioned herein, and are changed correspondingly when the two predetermined thresholds are changed from 5% to other percentages above and below the AC mains frequency.

When identifying that a frequency of ambient light flicker is the first frequency, the digital backend 27 generates one frame tick every first number (e.g., 640) of oscillations of the sampling frequency (or clock generated by the clock generator 271) in opposite to square wave signals, sets one count period to contain 100 square wave periods of the square wave signal, and cause the pixel array 25 to generate one image frame every third number (e.g., 10) of the frame ticks. When identifying that a frequency of ambient light flicker is the second frequency, the digital backend 27 generates one frame tick every second number (e.g., 533) of oscillations of the sampling frequency in opposite to square wave signals, sets one count period to contain 120 square wave periods of the square wave signal, and cause the pixel array 25 to generate one image frame every fourth number (e.g., 12) of the frame ticks. In this way, a frame rate of the optical sensor 200 is substantially kept identical (excluding fine-tuning on frame period mentioned above) corresponding to different AC mains frequency. More specifically, when the ambient light is well detected and the frame tick period (e.g., P1 mentioned above) is not adjusted, the frame rate of the optical sensor 200 is substantially the same in both 100 HZ and 120 HZ flicker frequencies.

The identification of the frequency of ambient light flicker of this embodiment is automatically performed in booting up the optical sensor, automatically performed every a predetermined time interval (e.g., every multiple count periods) during the optical sensor in operation, or controlled by a user (e.g., clicking a button or selecting on a screen) without particular limitations.

Furthermore, the identification of a frequency of ambient light flicker of this embodiment is performed in the same count period with or in different count periods from synchronizing the image frames to the ambient light flicker in the above embodiments. Preferably, every time when the digital backend 27 identifies that the frequency of ambient light flicker is changed with the AC mains, the digital backend 27 correspondingly performs the synchronization between the image frames and the ambient light flicker in the same period or different count periods in which the flicker detection is identified to be good.

It should be mentioned that although this embodiment is described with an example that the digital backend 27 compares a counting value of the last square wave signal (i.e. $P_{FLL}$ in FIGS. 4A and 4B) of one count period with at least one count threshold $P_{TH}$ to identify a frequency of ambient light flicker, the present disclosure is not limited thereto. In other aspects, to identify the frequency of ambient light flicker, the digital backend 27 compares an average of counting values of multiple square wave signals in one count period with the at least one count threshold $P_{TH}$, or compares each of counting values of multiple square wave signals in one count period with the at least one count threshold $P_{TH}$.

In FIG. 4A, since the flicker detection in the first count period is good, the digital backend 27 is shown to identify the frequency of ambient light flicker in the second count period, but the present disclosure is not limited thereto. It is possible that the digital backend 27 identifies the frequency of ambient light flicker in the third count period of FIG. 4A, in which a trigger tick is also formed.

In FIG. 4B, since the flicker detection in the third count period is good, the digital backend 27 is shown to identify the frequency of ambient light flicker in the fourth count period, but the present disclosure is not limited thereto. If the digital backend 27 identifies that the frequency of ambient light flicker changes in the first or the second count period, in which a trigger tick is also generated, states of the signals S_50 and S_60 are correspondingly changed at the first or the second count period.

It should be mentioned that the signals S_50 and S_60 change their states at any time point within the count period in which the flicker frequency is identified to be changed and are not limited to be aligned with a rising edge of the reference tick as shown in FIGS. 4A and 4B.

When identifying that the frequency of ambient light flicker is changed, the digital backend 27 correspondingly changes time points (or phases) at which frame ticks and image frames are generated.

In the present disclosure, when one count period is identified to have bad flicker detection (e.g., the second count period in FIG. 4B), the frequency identification and synchronization are not performed in a next count period thereto (e.g., the third count period in FIG. 4B).

The present disclosure further provides an operating method of an optical sensor 200, including the steps of: counting every square wave signal associated with ambient light flicker in a count period using a sampling frequency (Step S51); when the counting indicates good detection, comparing at least one counting value in the count period with at least on count threshold to identify a flicker frequency (Step S53); when the flicker frequency is a first frequency, generating one frame tick every first number of oscillations of the sampling frequency and generating one image frame every third number of frame ticks (Step S55); and when the flicker frequency is a second frequency, generating one frame tick every second number of oscillations of the sampling frequency and generating one image frame every fourth number of frame ticks (Step S57).

Step S51: In FIGS. 4A and 4B, each count period contains N square wave signals, which are formed by converting sine wave signals generated by detecting ambient light flicker by the photodiode 21, by the wave converter 23.

Step S53: When the ambient light flicker is well detected (as defined above), the digital backend 27 compares at least one counting value in a count period (e.g., $P_{FLL}$, but not limited to) with at least one count threshold $P_{TH}$ to identify a flicker frequency. Whereas when the ambient light flicker is not well detected, the comparing process is not performed.

Step S55: If $P_{FLL} > P_{TH}$, the flicker frequency is identified as a first frequency (e.g., 100 HZ), and the digital backend 27 generates one frame tick every first number (e.g., 640, but not limited to) of oscillations of the sampling frequency (e.g., 64 KHZ), and causes the pixel array 25 to generate one image frame every third number (e.g., 10) of frame ticks.

Step S57: If $P_{FLL} < P_{TH}$ Or $P_{FLL} = P_{TH}$, the flicker frequency is identified as a second frequency (e.g., 120 HZ), and the digital backend 27 generates one frame tick every second number (e.g., 533, but not limited to) of oscillations of the sampling frequency, and causes the pixel array 25 to generate one image frame every fourth number (e.g., 12) of frame ticks.

Accordingly, image frames are captured at substantially the same frame rate (excluding fine-tuning of the synchronization procedure) corresponding to different power system frequencies.

In the present disclosure, $P_{FLL}$ is also used to indicate a number of counting values in the last square wave signal of one count period.

It is appreciated that all values, e.g., including the sampling frequency, the flicker frequency of ambient light, the value of N, values of every threshold, the first number, the second number, the third number and the fourth number, mentioned herein are only intended to illustrate but not to limit the present disclosure.

As mentioned above, the conventional motion sensor can be influenced by ambient light flicker to have incorrect motion identification. Accordingly, the present disclosure further provides an optical sensor (e.g., FIG. 2) and an operating method thereof (FIGS. 3A-5) that generates a trigger tick for recognizing a flicker frequency of ambient light and calculating a phase of adjusting frame ticks only when the ambient light flicker is well detected so as to synchronize the image frames to different frequencies of ambient light flicker.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensor, comprising:
   a photodiode, configured to detect ambient light flicker to generate a light signal;
   a wave converter, configured to receive the light signal and to generate a square wave signal;
   a pixel array, configured to acquire image frames according to frame ticks; and
   a digital backend, configured to
      count the square wave signal using a sampling frequency,
      generate a trigger tick for adjusting the frame ticks,
      compare a counting value of a last square wave signal in a count period with at least one count threshold to identify whether a frequency of the ambient light flicker is a first frequency or a second frequency when the trigger tick is generated, and
      generate the frame ticks corresponding to the first frequency and the second frequency.

2. The optical sensor as claimed in claim 1, wherein the photodiode is separated from the pixel array.

3. The optical sensor as claimed in claim 1, wherein
   the first frequency is 100 HZ and the count period includes 100 square wave periods of the square wave signal, and
   the second frequency is 120 HZ and the count period includes 120 square wave periods of the square wave signal.

4. The optical sensor as claimed in claim 1, wherein
   the trigger tick is generated when the digital backend identifies that a counting value of every square wave signal within the count period is within two predetermined thresholds as well as a difference value between a maximum counting value and a minimum counting value among multiple counting values of all square wave signals within the count period is within a predetermined range.

5. The optical sensor as claimed in claim 1, wherein the digital backend is further configured to calculate a first time difference between a reference tick and the trigger tick,
   calculate a second time difference between a first frame tick of a next count period behind the count period and the trigger tick, and
   calculate a time offset between the first time difference and the second time difference to adjust a first period between a second frame tick of the next count period and the first frame tick according to the time offset.

6. The optical sensor as claimed in claim 5, wherein
   a rising edge of the reference tick is in-phase with a rising edge of a first square wave signal of the next count period, and
   a rising edge of the trigger tick is in-phase with a falling edge of the last square wave signal of the count period.

7. The optical sensor as claimed in claim 5, wherein a subsequent period of the frame ticks behind the second frame tick of the next count period is arranged as one square wave period of the square wave signal.

8. The optical sensor as claimed in claim 1, wherein
   upon identifying that the frequency is the first frequency, the digital backend is configured to generate one frame tick every first number of oscillations of the sampling frequency, and
   upon identifying that the frequency is the second frequency, the digital backend is configured to generate one frame tick every second number, different from the first number, of oscillations of the sampling frequency.

9. The optical sensor as claimed in claim 1, wherein the photodiode is included in at least one edge pixel of the pixel array.

10. The optical sensor as claimed in claim 1, wherein the digital backend is further configured not to compare the counting value of the last square wave signal in the count period with the at least one count threshold when the trigger tick is not generated.

11. An optical sensor, comprising:
a photodiode, configured to detect ambient light flicker to generate a light signal;
a wave converter, configured to receive the light signal and to generate a square wave signal;
a pixel array, configured to acquire image frames according to frame ticks; and
a digital backend, configured to
count the square wave signal using a sampling frequency,
generate a trigger tick for adjusting the frame ticks, and
compare a counting value of a last square wave signal in a count period with at least one count threshold to identify whether a frequency of the ambient light flicker is a first frequency or a second frequency when the trigger tick is generated,
wherein the pixel array is configured to acquire the image frames corresponding to the first frequency and the second frequency.

12. The optical sensor as claimed in claim 11, wherein the photodiode is separated from the pixel array.

13. The optical sensor as claimed in claim 11, wherein
the first frequency is 100 HZ and the count period includes 100 square wave periods of the square wave signal, and
the second frequency is 120 HZ and the count period includes 120 square wave periods of the square wave signal.

14. The optical sensor as claimed in claim 11, wherein
the trigger tick is generated when the digital backend identifies that a counting value of every square wave signal within the count period is within two predetermined thresholds as well as a difference value between a maximum counting value and a minimum counting value among multiple counting values of all square wave signals within the count period is within a predetermined range.

15. The optical sensor as claimed in claim 11, wherein the digital backend is further configured to
calculate a first time difference between a reference tick and the trigger tick,
calculate a second time difference between a first frame tick of a next count period behind the count period and the trigger tick, and
calculate a time offset between the first time difference and the second time difference to adjust a first period between a second frame tick of the next count period and the first frame tick according to the time offset.

16. The optical sensor as claimed in claim 15, wherein
a rising edge of the reference tick is in-phase with a rising edge of a first square wave signal of the next count period, and
a rising edge of the trigger tick is in-phase with a falling edge of the last square wave signal of the count period.

17. The optical sensor as claimed in claim 15, wherein a subsequent period of the frame ticks behind the second frame tick of the next count period is arranged as one square wave period of the square wave signal.

18. The optical sensor as claimed in claim 11, wherein the photodiode is included in at least one edge pixel of the pixel array.

19. The optical sensor as claimed in claim 11, wherein
upon identifying that the frequency is the first frequency by the digital backend, the pixel array is configured to acquire one image frame every first number of the frame ticks, and
upon identifying that the frequency is the second frequency by the digital backend, the pixel array is configured to acquire one image frame every second number, different from the first number, of the frame ticks.

20. The optical sensor as claimed in claim 11, wherein the digital backend is further configured not to compare the counting value of the last square wave signal in the count period with the at least one count threshold when the trigger tick is not generated.

* * * * *